United States Patent [19]
Park et al.

[11] Patent Number: 5,906,958
[45] Date of Patent: May 25, 1999

[54] CATALYST FOR PURIFYING AUTOMOBILE EXHAUSTS AND METHOD OF MANUFACTURING THE CATALYST

[75] Inventors: Sang-cheol Park; Chan-ho Pak, both of Seoul, Rep. of Korea

[73] Assignee: Samsung Electro-Mechanics Co., Ltd., Kyungki-do, Rep. of Korea

[21] Appl. No.: 08/731,241

[22] Filed: Oct. 11, 1996

[30] Foreign Application Priority Data

Oct. 14, 1995 [KR] Rep. of Korea ......... 95-35531

[51] Int. Cl.⁶ .................................. B01J 23/32
[52] U.S. Cl. ............. 502/324; 502/327; 502/328; 502/525; 423/239.1
[58] Field of Search .................. 502/324, 327, 502/328, 525; 423/239.1

[56] References Cited

U.S. PATENT DOCUMENTS 4,151,123   4/1979   McCann, III ...................... 502/525
5,128,305   7/1992   Yoshimoto et al. ............... 502/328

OTHER PUBLICATIONS

Naoto, et al. "No$_x$ Storage Reduction Type Catalyst for Lean Burn Engine (1)", 71th CATSJ Meeting Abstracts No. D3, vol. 37, 1995, pp. 98–99, with translation.

Naoki, et al. "No$_x$ Storage Reduction Type Catalyst for Lean Burn, Engine (2)", 71th CATSJ Meeting Abstracts No. D3, vol. 37, 1995, pp. 100–101, with translation.

*Primary Examiner*—Glenn Caldarola
*Assistant Examiner*—In Suk Bullock
*Attorney, Agent, or Firm*—Leydig, Voit & Mayer

[57] ABSTRACT

A catalyst for purifying exhaust gases of an automobile engine including a carrier coprecipitated with a material absorbing oxides of nitrogen ($NO_x$) and an active noble metal wherein the material absorbing oxides of nitrogen is at least one of barium manganese oxide ($BaMnO_3$) and calcium manganese oxide ($CaMnO_3$). The carrier coprecipitated with $BaMnO_3$ or $CaMnO_3$ shows superior capacity for absorbing oxides of nitrogen. Consequently, a catalyst according to the present invention can effectively purify engine exhaust, even in a lean burn environment.

20 Claims, No Drawings

CATALYST FOR PURIFYING AUTOMOBILE EXHAUSTS AND METHOD OF MANUFACTURING THE CATALYST

BACKGROUND OF THE INVENTION

The present invention relates to a catalyst for purifying exhaust gases of an automobile engine and a method of manufacturing the catalyst, for more effectively removing harmful gases from the exhaust gases of an automobile engine, such as hydrocarbons, carbon monoxide, and oxides of nitrogen ($NO_x$).

Currently, with the increase in the number of automobiles, air pollution due to exhaust gases is becoming more and more serious. Diesel engine automobiles generate the most exhaust, and the chief harmful components of the exhaust are hydrocarbons, carbon monoxide, and oxides of nitrogen ($NO_x$).

The research into methods of removing these harmful gases has been divided largely into fuel improvement, engine improvement, and exhaust treatment. In exhaust treatment, the use of a catalyst has proven to be most effective.

At present, the most typical catalyst for purifying the exhaust gases of an automobile engine is a 3-way catalyst in which a carrier coats a substrate, typically a honeycomb structure. The carrier is impregnated with a noble metal, such as platinum (Pt) or rhodium (Rh), and an oxygen absorbing material.

Such a 3-way catalyst shows a high degree of purification efficiency with respect to harmful 3-way gases, i.e., hydrocarbons, carbon monoxide, and oxides of nitrogen, at the ideal air-to-fuel ratio of 14.7:1. Recently, however, a lean-burn automobile engine has been developed in which combustion occurs in a lean-burn environment (an air-to-fuel ratio of 18~25:1), that is, with more air than the ideal air-to-fuel ratio.

Compared to the conventional automobile engine, the lean-burn automobile engine is advantageous in that the quantity of exhaust is decreased and fuel efficiency is improved. Although the lean-burn automobile engine has less exhaust, however, it is difficult to remove oxides of nitrogen from the exhaust, since in a lean-burn environment where the air-to-fuel ratio is high, oxidation of carbon monoxide and hydrocarbons readily occurs, but a reduction reaction is difficult. Thus, the lean-burn automobile engine has a particular problem in that oxides of nitrogen remain in the exhaust and act as a harmful pollutant.

Therefore, a catalyst capable of effectively removing oxides of nitrogen from the exhaust is required, especially for lean-burn automobile engines which operate in a lean-burn environment.

The catalysts for removing oxides of nitrogen can be largely divided into a selective contact reduction type and a storage reduction type. The selective contact reduction type catalyst wherein an active noble metal, such as Pt, Rh, or Pd, is impregnated into a Cu-ion exchange type zeolite, ZSM-5, is disadvantageous in that the removal efficiency for oxides of nitrogen is very low (about 35%) and heat-resistance and durability are poor.

Meanwhile, the storage reduction type catalyst in which a material absorbing oxides of nitrogen and an active noble metal, such as Pt, Rh, or Pd, are impregnated into alumina is advantageous in that heat-resistance and durability are good.

However, the conventional storage reduction type catalyst does not have a high purification efficiency for oxides of nitrogen because the absorbing material employed in the conventional catalyst does not have a high storage, i.e., absorbing, capacity for oxides of nitrogen.

SUMMARY OF THE INVENTION

An object of the present invention is to provide a catalyst of the absorption reduction type for effectively purifying exhaust gases of an automobile engine and, in particular, reducing oxides of nitrogen produced in a lean-burn environment.

Another object of the present invention is to provide a method of fabricating a catalyst capable of effectively purifying exhaust gases of an automobile engine and, in particular, reducing oxides of nitrogen produced in a lean burn environment.

To achieve an object of the invention, there is provided a catalyst for purifying exhaust gases of an automobile engine in which a material absorbing oxides of nitrogen ($NO_x$) is coprecipitated with a carrier and an active noble metal, wherein the material absorbing oxides of nitrogen is at least one selected from the group consisting of barium manganese oxide ($BaMnO_3$) and calcium manganese oxide ($CaMnO_3$). Optionally, an active noble metal may also be impregnated in a carrier.

To achieve another object of the invention, there is provided a method of fabricating a catalyst for purifying exhaust of an automobile engine comprising:

(a) preparing a solution wherein manganese nitrate and one metal salt selected from the group consisting of a barium salt and a calcium salt are dissolved, (b) mixing the solution with a carrier material, and (c) adding sodium carbonate to the mixture obtained in step (b) and stirring to coprecipitate the carrier with a composite metal oxide selected from the group consisting of barium-manganese oxide and calcium-manganese oxide, (d) mixing the carrier coprecipitated with a composite metal oxide with a noble metal in a solvent to produce a slurry, (e) wash-coating a substrate with the slurry, and (f) air-blowing, drying, and thermally treating the substrate wash-coated with the slurry. Optionally, the noble metal may be separately impregnated in a carrier.

DETAILED DESCRIPTION OF THE INVENTION

According to the present invention, γ-alumina, zeolite, or titanium oxide ($TiO_2$) are preferred as a carrier, preferably γ-alumina. The noble metal is desirably palladium (Pd), platinum (Pt), or rhodium (Rh). The noble metal may be present in an amount of 0.1~5 wt % based on the weight of the carrier. Also, a material absorbing oxides of nitrogen ($NO_x$), such as $BaMnO_3$ or $CaMnO_3$, is preferably coprecipitated in a carrier.

In the fabrication of a catalyst according to a coprecipitation process, first, manganese nitrate and one of barium nitrate and calcium nitrate are put into a beaker. Then, pure water is added, the solution is heated and stirred for thirty minutes, and the solution is kept warm for one hour to produce a solution in which the solutes are completely dissolved. The prepared solution is poured into a beaker containing a carrier and then stirred. It is desirable that the stirring continue for two to four hours at 60~80° C. The resulting mixture is heated while being stirred and $Na_2CO_3$ is added slowly to form barium manganese oxide or calcium manganese oxide. The carrier is coprecipitated with the oxide in this step. It is desirable that the stirring continue for two to four hours at 60~80° C.

Next, the barium manganese oxide or calcium manganese oxide-coprecipitated carrier, an active noble metal, and other components are mixed, preferably in a solvent, typically water, and binder, such as alumina sol, and milled to form a slurry. The active noble metal is desirably rhodium, platinum, or palladium. The active noble metal may be separately impregnated in a carrier. The slurry is wash-coated on a substrate, preferably a honeycomb structure, and air-blown, dried, and thermally treated, in sequence, to produce a catalyst according to an embodiment of the present invention. It is desirable that the drying continue for 10~20 hours at 100~120° C. and the thermal treatment be performed for 2~4 hours at 400~600° C.

The present invention will be described in greater detail with reference to the following examples.

EXAMPLE 1

4.6943 g of $Ba(NO_3)_2$ and 5.2245 g of $Mn(NO_3)_2$ were put into a beaker with 150 g of pure water, and then dissolved completely by being stirred for one hour at 70° C. The resulting solution was poured into a beaker containing 10 g of $\gamma$-$Al_2O_3$ and stirred for two hours at 70° C.

The resulting mixture was stirred for three hours at 70° C. after adding 15.892 g of 30% $Na_2CO_3$ solution slowly to produce a coprecipitate. The coprecipitate was washed and dried to obtain a powder. The powder was heated in a thermal treatment in an electric furnace at 600° C. for five hours to produce a desired product, $BaMnO_3$-coprecipitated $\gamma$-$Al_2O_3$. The capacity of the product to absorb nitric oxide was measured with a temperature programmed desorption (TPD) device and the result is shown in Table 1. In this test, a mixture of one percent nitric oxide and 99 percent helium is supplied to the product at a rate of 100 ml/min for thirty minutes. Then, the product is heated at a constantly increasing rate of 10° C./min to 700° C. and the amount of evolved nitric oxide is measured to determine the capacity of the product to absorb oxides of nitrogen.

EXAMPLE 2

A carrier particle, $CaMnO_3$-coprecipitated $\gamma$-$Al_2O_3$, was produced in the same manner as Example 1 except that $Ca(NO_3)_2$ was used instead of $Ba(NO_3)_2$. Moreover, using the same TPD device and test as used in Example 1, the capacity of the carrier particle to absorb nitric oxide was measured and the result is also shown in Table 1.

EXAMPLE 3

Using the same TPD device and test as used in Example 1, the capacity of $BaMnO_3$ only to absorb nitric oxide was measured and the result is shown in Table 1.

EXAMPLE 4

Using the same TPD device and test as used in Example 1, the capacity of $CaMnO_3$ only to absorb nitric oxide was measured and the result is shown in Table 1.

Comparative Example 1

For comparison, using the same TPD device and test as used in Example 1, the capacity of $YSr_2Co_4O_Y$ to absorb nitric oxide measured and the result is shown in Table 1.

Comparative Example 2

For comparison, using the same TPD device and test as used in Example 1, the capacity of $YBa_2Cu_4O_y$ to absorb nitric oxide was measured and the result is shown in Table 1.

TABLE 1

| | Sample Used | Nitric oxide absorption ($\mu$mol/g) |
| --- | --- | --- |
| Example 1 | 30% $BaMnO_3$/$\gamma$-$Al_2O_3$ | 485.5 |
| Example 2 | 30% $CaMnO_3$/$\gamma$-$Al_2O_3$ | 473.7 |
| Example 3 | $BaMnO_3$ | 27.5 |
| Example 4 | $CaMnO_3$ | 26.5 |
| Com. Example 1 | $YSr_2Co_4O_y$ | 19.7 |
| Com. Example 2 | $YBa_2Cu_4O_y$ | 13.1 |

As shown in Table 1, $BaMnO_3$ or $CaMnO_3$, and particularly a carrier coprecipitated with $BaMnO_3$ or $CaMnO_3$ shows superior capacity for absorbing nitric oxide. Although the examples show only results for absorption of nitric oxide, the catalyst according to the present invention also effectively absorbs other oxides of nitrogen ($NO_x$). Consequently, a catalyst according to the present invention can effectively purify oxides of nitrogen in exhaust, even in a lean burn environment.

We claim:

1. A catalyst for purifying exhaust gases of an automobile engine, said catalyst including a material absorbing oxides of nitrogen coprecipitated with a carrier and an active noble metal wherein said material absorbing oxides of nitrogen is at least one selected from the group consisting of barium manganese oxide ($BaMnO_3$) and calcium manganese oxide ($CaMnO_3$).

2. The catalyst as claimed in claim 1 wherein said carrier is at least one selected from the group consisting of $\gamma$-alumina, zeolite, and titanium oxide.

3. The catalyst as claimed in claim 2 wherein said carrier is $\gamma$-alumina.

4. The catalyst as claimed in claim 1 wherein said noble metal is selected from the group consisting of palladium, platinum, and rhodium.

5. The catalyst as claimed in claim 1 wherein said carrier is impregnated with said noble metal.

6. The catalyst as claimed in claim 1 wherein said active noble metal is 0.1~5 wt % of said carrier.

7. The catalyst as claimed in claim 1 wherein said nitrogen oxide absorbing material is 5~50 wt % of said carrier.

8. A method of fabricating a catalyst for purifying exhausts of an automobile comprising:

(a) preparing a solution in which manganese nitrate and at least one of barium nitrate and calcium nitrate are dissolved, (b) mixing the solution with a carrier, and (c) adding sodium carbonate to the mixture obtained in step (b) and then stirring to coprecipitate the carrier with a composite metal oxide selected from the group consisting of barium-manganese oxide and calcium-manganese oxide;

(d) mixing the carrier coprecipitated with the composite metal oxide with a noble metal in a solvent to produce a slurry;

(e) wash-coating a substrate with the slurry; and (f) air-blowing, drying, and thermally treating the substrate wash-coated with the slurry.

9. The method of fabricating a catalyst as claimed in claim 8 including drying the substrate wash-coated with the slurry for 10–20 hours at 100–120° C.

10. The method of fabricating a catalyst as claimed in claim 8 including thermally treating the substrate wash-coated with the slurry for 2–6 hours at 400–600° C.

11. The method of fabricating a catalyst as claimed in claim 8 including impregnating the carrier with the noble metal.

12. The method of claim 8 wherein the carrier comprises particles.

13. The method of claim 8 comprising impregnating the carrier with the noble metal or the composite metal oxide.

14. The method of claim 8 comprising impregnating the carrier with the noble metal and the composite metal oxide.

15. A particulate catalyst comprising:

a particulate carrier;

an active noble metal; and a material absorbing oxides of nitrogen, and selected from the group consisting of barium manganese oxide and calcium manganese oxide wherein the active noble metal and the material are disposed on the particulate carrier.

16. The particulate catalyst according to claim 15 wherein the particulate carrier is selected from the group consisting of titanium oxide, γ-alumina, and a zeolite.

17. The particulate catalyst according to claim 15 wherein the active noble metal is selected from the group consisting of Pd, Pt, and Rh.

18. The particulate catalyst according to claim 15 wherein the particulate catalyst absorbs at least about 473.7 micromoles of nitric oxide per gram of catalyst.

19. The particulate catalyst according to claim 15 wherein the particulate catalyst absorbs between from about 473.7 to about 485.5 micromoles of nitric oxide per gram of catalyst.

20. The particulate catalyst according to claim 15 wherein the carrier is co-precipitated with the active noble metal and the material.

* * * * *